219-121 SR

1/28/86 OR 4,567,346

United States Patent [19]

Marhic

[11] Patent Number: 4,567,346

[45] Date of Patent: Jan. 28, 1986

[54] ARC-STRIKING METHOD FOR A WELDING OR CUTTING TORCH AND A TORCH ADAPTED TO CARRY OUT SAID METHOD

[75] Inventor: Gérard Marhic, Cergy, France

[73] Assignee: L'Air Liquide, Societe Anonyme pour l'Etude et l'Exploitation des Procedes Georges Claude, Paris, France

[21] Appl. No.: 672,503

[22] Filed: Nov. 19, 1984

[30] Foreign Application Priority Data

Dec. 7, 1983 [FR] France ................................ 83 19554

[51] Int. Cl.[4] ................................................ B23K 9/00

[52] U.S. Cl. ........................ 219/121 PB; 219/121 PR; 219/121 PW; 219/75; 219/121 PY

[58] Field of Search ...... 219/121 P, 121 PY, 121 PR, 219/121 PP, 121 PW, 121 PB, 75, 74, 124.01; 313/231.31-231.51; 315/330, 331, 111.21

[56] References Cited

U.S. PATENT DOCUMENTS

| | | | |
|---|---|---|---|
| 2,898,441 | 8/1959 | Reed | 219/75 |
| 3,242,305 | 3/1966 | Kane et al. | 219/75 |
| 3,832,513 | 8/1974 | Klasson | 219/121 PW |
| 4,370,539 | 1/1983 | Garlanov et al. | 219/121 PR |

FOREIGN PATENT DOCUMENTS

| | | | |
|---|---|---|---|
| 2385483 | 10/1978 | France | 219/121 P |

*Primary Examiner*—M. H. Paschall
*Attorney, Agent, or Firm*—Lee C. Robinson, Jr.

[57] ABSTRACT

The invention relates in particular to plasma cutting. The nozzle (5) is freely slidably mounted in the torch body so as to come into contact with the electrode if the torch is applied against the work piece (16). By disengaging the torch, an arc is struck between the electrode and the nozzle and then transferred to the work piece. Application in particular to low-power plasma torches.

10 Claims, 4 Drawing Figures

ARC-STRIKING METHOD FOR A WELDING OR CUTTING TORCH AND A TORCH ADAPTED TO CARRY OUT SAID METHOD

The present invention relates to the striking of an arc for a welding or cutting torch and more particularly a plasma cutting torch, of the type comprising an electrode coaxially disposed inside a metal nozzle guiding a gas escaping through an orifice aligned with said electrode.

Usually, this arc is struck by means of high-frequency discharges which are established in the gas circulating between the electrode and the nozzle. These auxiliary means for creating high-frequency discharges have been found to be costly, especially for low-power plasma cutting torches. It has been proposed to mount, in the torch body, the electrode and the nozzle to have an axial displacement between a maximum spacing position corresponding to a normal spacing in operation and a position of mutual contact. The electrode was connected to a negative terminal of a source of dc current and the nozzle to the positive terminal. To strike the arc the electrode was moved toward the nozzle until they came into mutual contact and then away from the nozzle so as to create an arc in the plasmagen gas circulating in the space between the electrode and the nozzle. In this manner of proceeding, the electrode was slidably mounted in the torch body and, more precisely, the electrode was screwthreadedly engaged with a screwthread on the torch body so that the electrode moved toward and away from the nozzle, which strikes the arc, by turning a knurled knob. Such an arrangement had the drawback of being very slow and causing damage to the nozzle owing to the maintenance of an arc for a rather long period of time. In addition, the arc could only be subsequently transferred to the work piece after a complete retraction of the electrode.

An object of the present invention is to provide an arc-striking method for a welding or cutting torch which is particularly rapid to carry out, and a welding or cutting torch which is particularly simple to construct.

According to the invention, a terminal of the source of current is connected only to the work piece to be treated, and the putting of the torch nozzle at an electric potential is achieved solely by a direct contact between said nozzle and said work piece. The mutual axial displacement between the electrode and the nozzle is accomplished by a freely slidable mounting of the nozzle in the torch body. The nozzle is biased to its correct working position by a resiliently yieldable force, and the electrode and the nozzle move towards each other by causing the nozzle to bear directly against said work piece. The arc-striking operation comprises, first of all upon a reduction in the bearing pressure, as mentioned above, the creation of an arc between the electrode and the nozzle and then, after a separation of the torch from the work piece, the immediate transfer of this arc to the work piece itself.

It will be understood that, owing to the freely slidable mounting of the nozzle on the torch body, the arc-striking operation is substantially instantaneous and very easy to achieve since it is sufficient to exert a slight manual pressure on the torch body and, moreover, the transfer of the arc to the work piece is also immediate.

In a welding torch of the above-defined type, the mutually axially slidable assembly of the electrode and the nozzle is achieved by a freely slidable mounting of the nozzle in the torch body with a resiliently yieldable means biasing the nozzle to its position of maximum spacing.

The invention will now be described with reference to the accompanying drawing in which.

Figure 1:
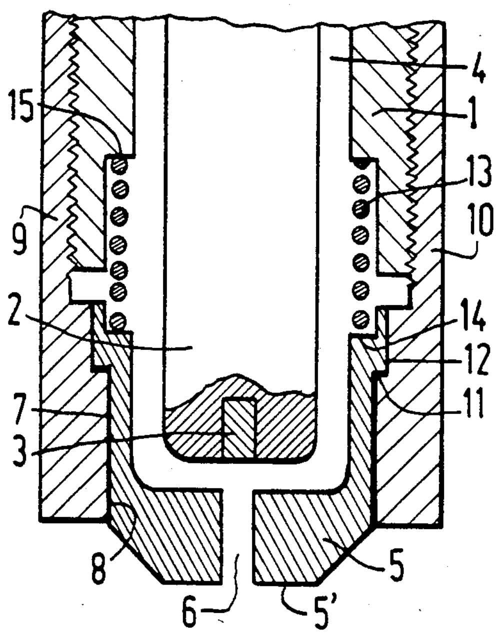
FIG. 1 is an axial sectional view of the head of a welding torch in an inoperative position.

With references to FIGS. 1–4, a cutting torch according to the invention comprises, in a torch body the front end 1 of which is shown, an axial electrode 2 with an emitting insert 3. The torch body 1 and the electrode 2 define an annular passage 4 for a plasmagen gas between the electrode and the torch body. Mounted at the end of the torch body is a nozzle 5 defining in its front part 5′ an aligned discharge orifice 6 coaxial with the electrode 2. This nozzle 5 is mounted by its cylindrical outer surface 7 to slide in a cylindrical inner bearing surface 8 of a nozzle holder 9 which is screwed at 10 on the torch body 1, the cylindrical bearing surface 8 terminating in an inner shoulder 11 against which an outwardly projecting portion 12 of the nozzle abuts. This portion 12, when it bears against the abutment shoulder 11, determines the correct axial spacing between the nozzle 5 and the electrode 2 during the cutting operation. This correct position of the nozzle is achieved by the pressure exerted by a compression spring 13 which bears against a nozzle groove 14 and against a recess 15 in the torch body 1.

In operation, and starting in the position shown in FIG. 1, the plasmagen gas is supplied to the space between the electrode and the nozzle and flows through the orifice 6. The cutting current generator 19 (FIG. 2) is connected by its negative terminal to the electrode 2 and by its positive terminal to the work piece 16 to be cut, which is at this moment located at a certain distance from the welding torch.

Figure 2:
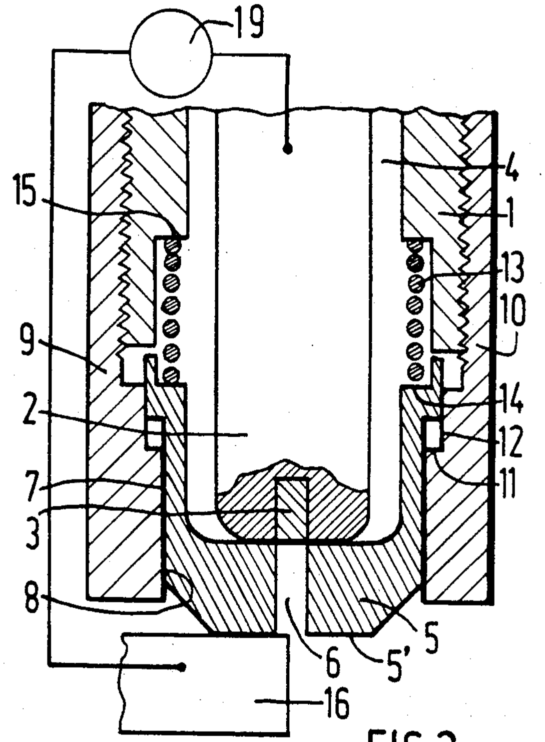
FIG. 2 is a view similar to FIG. 1 with the torch in the first arc-striking stage.
Figure 3:
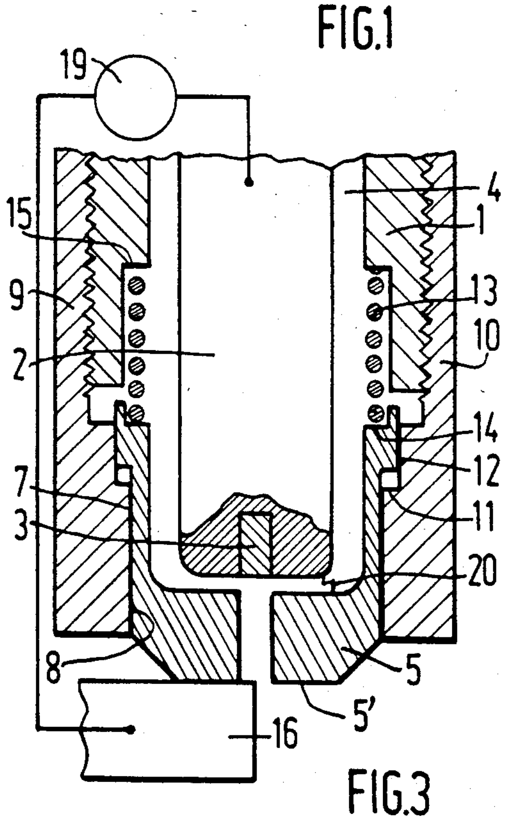
FIG. 3 is a view similar to FIG. 2, the torch being in the second arc-striking stage.
Figure 4:
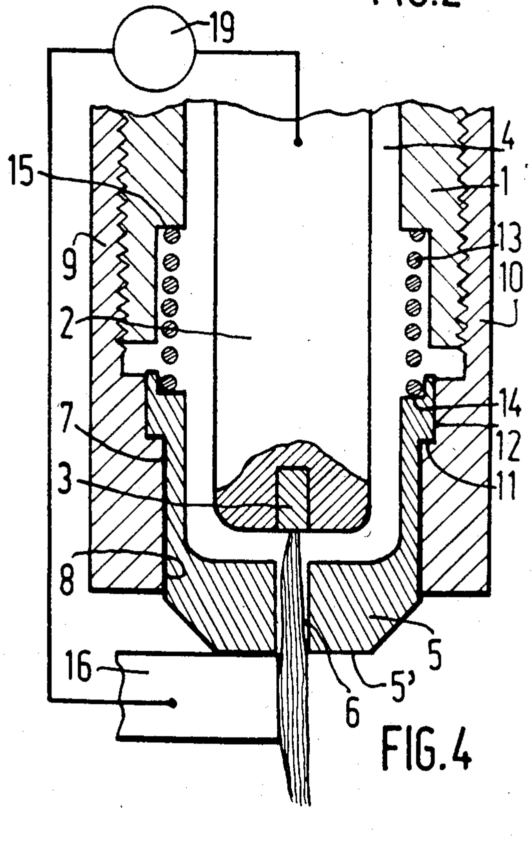
FIG. 4 is a view similar to FIG. 3, the torch being in the final arc-striking stage.

In FIG. 2, the operator has moved the torch closer to the work piece 16 in a direction perpendicular to the plane of the workpiece. The front face 5′ of the nozzle 5 has been brought in contact with the work piece 16, and pressure is exerted to move the torch body 1 and the electrode 2 with respect to the nozzle 5, which is then immobilized, against the action of the compression spring 13 until the electrode 2 comes into contact with the inner surface of the nozzle 5.

At this moment, the current generator is shorted and the current flows from the work piece 16 to the nozzle 5 and from the nozzle 5 to the electrode 2. By slightly reducing the pressure exerted by the operator, it can be seen in FIG. 3 that the torch body moves slightly away from the work piece 16 and thus also moves the electrode 2 in the same direction, while the nozzle 5 is still in contact with the work piece 16 under the effect of the compression spring 13. Consequently an aleatory arc is formed between the electrode 2 and the nozzle 5 as shown at 20. This arc increases in length until the should 11 on nozzle holder 9 connected to the torch body 1 abuts against the portion 12 of the nozzle 5. Thenceforth, any additional rearward movement of the welding torch results in the nozzle moving slightly away from the work piece to be cut so that the cutting operation can be commenced with no other precaution.

Instead of using a compression spring for moving the nozzle away from the electrode, the effect of the thrust of the plasmagen gas on the nozzle, which tends to move the latter away from the electrode, can be used. The invention is applicable to both cutting and welding.

What is claimed is:

1. A cutting or welding torch for connection to an electric current source, the torch comprising a torch body, a metal nozzle mounted in said body and defining an orifice for guiding a gas, the nozzle being structurally isolated from said current source, an electrode coaxially disposed inside said nozzle and in alignment with said orifice, said electrode and said nozzle being mounted in said torch body in such manner as to be mutually axially movable between a maximum spacing position corresponding to a normal spacing in operation and a position of mutual contact, to provide freely slidable movement of said nozzle and said body, and resilient yieldable means cooperable with said nozzle for biasing said nozzle to a position in which it is spaced at a maximum distance from said electrode.

2. A torch according to claim 1, wherein said gas exerts a thrust on said nozzle to bias the same toward said maximum spacing position.

3. A torch according to claim 1, wherein said resiliently yieldable means comprises a compression spring interposed between said nozzle and said torch body.

4. A torch according to claim 1, the torch body comprising a nozzle holder defining an abutment cooperable with said nozzle for determining said position in which said nozzle is spaced a maximum distance from said electrode.

5. A torch according to claim 2, the torch body comprising a nozzle holder defining an abutment cooperable with said nozzle for determining said position in which said nozzle is spaced a maximum distance from said electrode.

6. A torch according to claim 3, the torch body comprising a nozzle holder defining an abutment cooperable with said nozzle for determining said position in which said nozzle is spaced a maximum distance from said electrode.

7. An arc torch for cutting or welding work to be treated, the torch comprising, in combination:

a torch body;

nozzle means supported by the torch body;

an electrode carried by the torch body, the electrode and the nozzle means being movable relative to each other between a maximum spaced-apart position and a position of mutual contact;

biasing means for urging the nozzle means away from the electrode toward said maximum spaced-apart position;

a single current source having a pair of terminals;

means for connecting one of said terminals to the electrode; and means for connecting the other of said terminals solely to the work, to thereby bring the work to the potential of said other terminal;

movement of the torch body toward the work bringing the nozzle means into direct contact with said work to apply said potential to the nozzle means;

continued movement of the torch body toward the work bringing the electrode into contact with the nozzle means against the bias of said biasing means; and movement of the torch body away from the work separating the electrode and the nozzle means, to create an arc therebetween, and thereafter separating said nozzle means from said work, to transfer the arc to the work.

8. In an arc-striking method for a welding or cutting torch having a nozzle and an electrode in axially movable relationship relative to each other between a spaced operating position and a position in contacting with another, the steps of resiliently biasing the nozzle and the electrode apart to maintain the same in said spaced operating position;

connecting one terminal of a current source solely to the work to be treated while maintaining the nozzle electrically isolated from said source;

moving the torch relative to the work to bring the nozzle into direct contact with said work and thereby apply the electrical potential from said one terminal through the work to said nozzle;

continuing the movement of the torch relative to the work to axially displace the electrode relative to the nozzle against said resilient bias until they are in mutual contact creating a short;

separating the electrode and the nozzle while maintaining said nozzle in direct contact with said work, to thereby create an arc between said electrode and said nozzle; and moving the torch and the work apart to similarly move apart said nozzle and said work to transfer the arc to said work, the resilient bias between said nozzle and said electrode returning the same to spaced operating position.

9. In an arc-striking method for a welding or cutting torch having a nozzle and an electrode in axially movable relationship relative to each other between a spaced operating position and a position in contact with one another, the steps of resiliently biasing the nozzle and the electrode apart to maintain the same in said spaced operating position;

connecting one terminal of a current source solely to the work to be treated while maintaining the nozzle electrically isolated from said source;

connecting the other terminal of the current source to said electrode;

moving the torch toward the work to bring the nozzle into direct contact therewith and thereby apply the electrical potential from said one terminal through the work to said nozzle;

continuing the movement of the torch toward the work to axially displace the electrode relative to the nozzle against said resilient bias until they are in mutual contact creating a short;

thereafter moving the torch away from the work while maintaining said nozzle in direct contact therewith, to create an arc between said electrode and said nozzle; and continuing the movement of the torch away from the work to similarly move said nozzle and transfer the arc to said work, the resilient bias between said nozzle and said electrode returning the same to said spaced operating position.

10. In a method as defined in claim 9, in which an electrical potential is applied to said nozzle solely by its contact with said work.

* * * * *